(12) United States Patent
Matza

(10) Patent No.: US 10,179,881 B2
(45) Date of Patent: *Jan. 15, 2019

(54) COMPOSITION AND METHOD FOR ISOLATION OF PARAFFINIC HYDROCARBONS

(71) Applicant: TriStar PetroServ, Inc., Houston, TX (US)

(72) Inventor: Stephen D. Matza, Houston, TX (US)

(73) Assignee: TriStar PetroServ, Inc., Houston, TX (US)

( * ) Notice: Subject to any disclaimer, the term of this patent is extended or adjusted under 35 U.S.C. 154(b) by 212 days.

This patent is subject to a terminal disclaimer.

(21) Appl. No.: 14/987,522

(22) Filed: Jan. 4, 2016

(65) Prior Publication Data

US 2017/0190985 A1 Jul. 6, 2017

(51) Int. Cl.
- *B01D 17/04* (2006.01)
- *C10G 33/04* (2006.01)
- *C10G 21/27* (2006.01)

(52) U.S. Cl.
CPC .......... *C10G 33/04* (2013.01); *B01D 17/042* (2013.01); *B01D 17/047* (2013.01); *C10G 21/27* (2013.01); *C10G 2300/201* (2013.01)

(58) Field of Classification Search
CPC .. C10G 33/04; C10G 2300/201; C10G 21/27; B01D 17/042; B01D 17/047
USPC ......... 208/188; 210/708, 767, 768; 516/147, 516/200
See application file for complete search history.

(56) References Cited

U.S. PATENT DOCUMENTS

| | | | | |
|---|---|---|---|---|
| 4,105,542 A * | 8/1978 | Fainman | ............ | C10M 175/005 208/180 |
| 5,085,710 A * | 2/1992 | Goss | ............ | B08B 9/08 134/22.14 |
| 5,244,566 A * | 9/1993 | Bond | ............ | B01J 20/26 134/40 |
| 5,900,048 A * | 5/1999 | Olson | ............ | B29C 33/60 106/124.62 |
| 6,090,769 A * | 7/2000 | Vlasblom | ............ | C11D 3/18 510/365 |
| 6,093,689 A * | 7/2000 | Vlasblom | ............ | C11D 1/83 510/365 |
| 6,197,734 B1 * | 3/2001 | Vlasblom | ............ | C11D 1/72 510/188 |
| 6,310,263 B1 * | 10/2001 | Vlasblom | ............ | C11D 1/72 510/365 |

(Continued)

OTHER PUBLICATIONS

Pilot Chemical Company, Product Data Sheet for Calimulse™ PRS. Undated. Obtained from the company website on Mar. 5, 2010.*

*Primary Examiner* — Daniel S Metzmaier
(74) *Attorney, Agent, or Firm* — Tumey L.L.P.

(57) ABSTRACT

A method and composition for isolating a paraffinic hydrocarbon layer from a sludge comprising a mixture of paraffinic hydrocarbons, water, and solids are provided. The method comprises providing a paraffinic hydrocarbon isolation composition comprising isopropylamine dodecylbenzene sulfonate, a surfactant, and a solvent; contacting the sludge with the paraffinic hydrocarbon isolation composition; and allowing the paraffinic hydrocarbon isolation composition to separate the sludge into a three phase separation comprising a paraffinic hydrocarbon layer, a water layer, and a layer of settled solids.

14 Claims, 1 Drawing Sheet

(56) References Cited

U.S. PATENT DOCUMENTS

| | | | |
|---|---|---|---|
| 6,369,016 B1* | 4/2002 | Vlasblom | C11D 1/83 |
| | | | 510/365 |
| 6,440,330 B1* | 8/2002 | Campbell | B01D 17/00 |
| | | | 252/364 |
| 6,462,011 B1* | 10/2002 | Collins | C11D 1/62 |
| | | | 510/188 |
| 2008/0169222 A1* | 7/2008 | Ophus | C10G 1/047 |
| | | | 208/390 |
| 2015/0057377 A1* | 2/2015 | Jones | B01D 17/047 |
| | | | 516/135 |
| 2017/0190985 A1* | 7/2017 | Matza | C10G 33/04 |
| 2017/0190986 A1* | 7/2017 | Matza | C10G 33/04 |
| 2017/0190987 A1* | 7/2017 | Matza | C10G 33/04 |

* cited by examiner

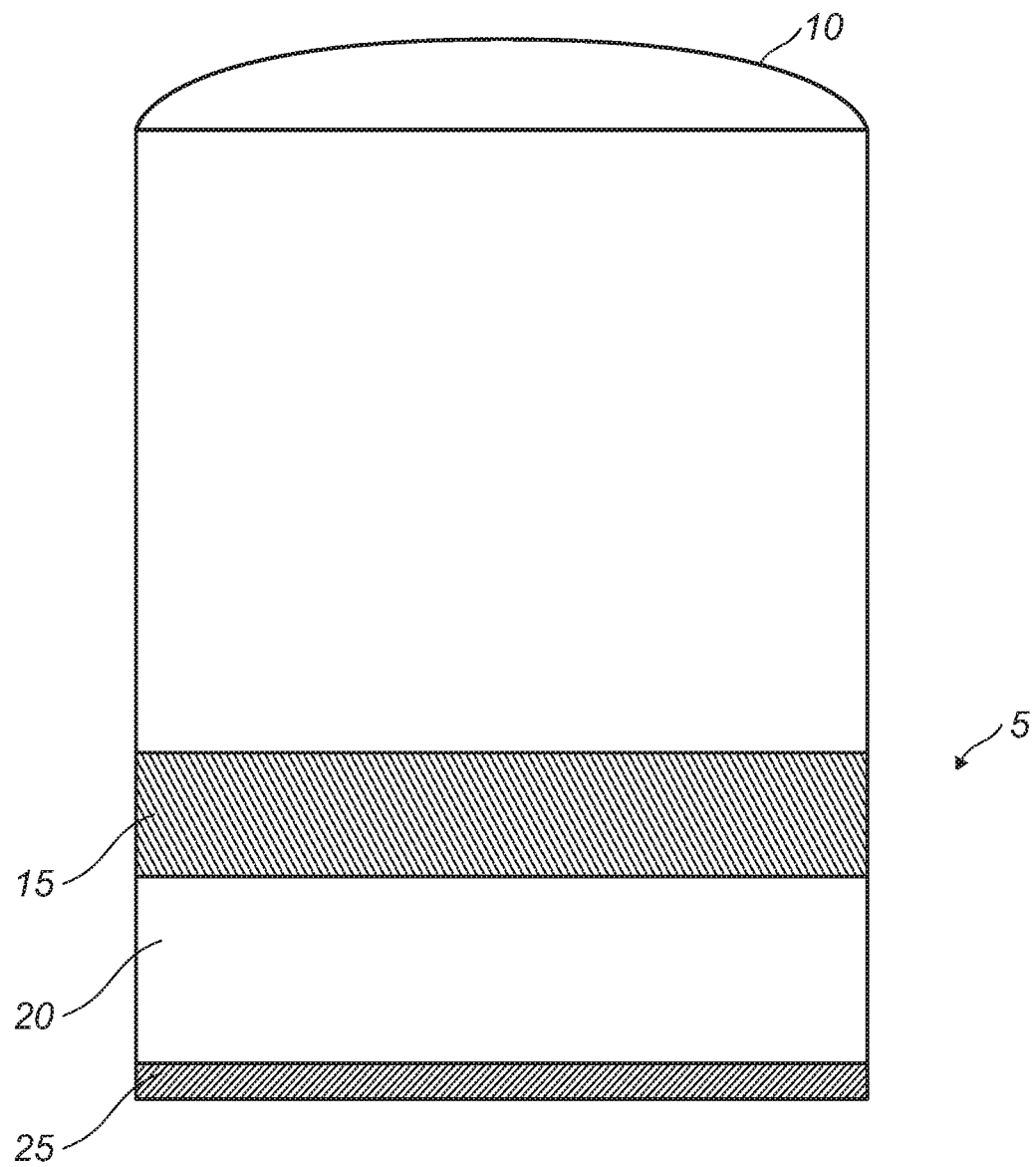

US 10,179,881 B2

COMPOSITION AND METHOD FOR ISOLATION OF PARAFFINIC HYDROCARBONS

BACKGROUND OF THE INVENTION

Field of the Invention

This invention relates to the field of industrial facility cleanup and oil extraction, and, more specifically, a composition and method for paraffinic oil isolation from crude oil tanks containing the paraffinic oil are provided.

Background of the Invention

During production, crude oil may be produced that contains dissolved waxes or paraffins. The solubility of high-molecular weight paraffin is related to temperature. When the temperature of the crude oil, or fluid in which the paraffin is dissolved, is lower than the wax precipitation temperature, the paraffin wax may precipitate and deposit under these environmental conditions. The precipitated paraffin wax may form stable wax crystals that deposit on the surfaces of equipment. When the crude oil is refined, the fractional distillation may separate one fraction of hydrocarbons from the paraffinic hydrocarbons. As a part of the process, the remaining fraction containing the paraffinic hydrocarbons may contain solids and water.

The paraffinic hydrocarbons may exist as sludge and may be stored in crude oil tanks, which are sometimes referred to as waxy crude oil tanks. The paraffinic hydrocarbons are a valuable commodity, yet the purification and separation of the paraffinic hydrocarbons from the solids and the water may be difficult, and the costs may exceed the value of the volume of the paraffinic oil.

Previous approaches to removing the paraffinic hydrocarbons have included heating the sludge deposits, dissolving them with chemical solvents, or modifying the ability of the wax to undergo crystal formation using polymeric wax crystal modifiers. Such approaches, however, do not isolate the paraffinic hydrocarbons, but merely remove them from surfaces and/or stop deposition. Therefore, the valuable paraffinic hydrocarbons are disposed of, and their value wasted. Further, their removal and subsequent disposal may also be an extra cost on the overall refinement process.

Consequently, there is a need for a new composition and method for the isolation and removal of paraffinic hydrocarbons.

BRIEF DESCRIPTION OF THE DRAWINGS

The FIGURE illustrates certain aspects of some of the examples of the present disclosure and should not be used to limit or define the method. The FIGURE illustrates a three phase separation comprising a paraffinic hydrocarbon layer, a water layer, and a layer of settled water-wet solids in accordance with certain examples.

BRIEF SUMMARY OF SOME OF THE PREFERRED EMBODIMENTS

These and other needs in the art are addressed in an embodiment by a method for isolating a paraffinic hydrocarbon layer from a sludge comprising a mixture of paraffinic hydrocarbons, water, and solids. The method may comprise providing a paraffinic hydrocarbon isolation composition comprising isopropylamine dodecylbenzene sulfonate, a surfactant, and a solvent; contacting the sludge with the paraffinic hydrocarbon isolation composition; and allowing the paraffinic hydrocarbon isolation composition to separate the sludge into a three phase separation comprising a paraffinic hydrocarbon layer, a water layer, and a layer of settled solids.

These and other needs in the art are addressed in an embodiment by a composition for isolating a paraffinic hydrocarbon layer from a sludge comprising a mixture of paraffinic hydrocarbons, water, and solids. The paraffinic hydrocarbon isolation composition may comprise isopropylamine dodecylbenzene sulfonate; a surfactant; and a solvent.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

DETAILED DESCRIPTION

In embodiments, the method for isolation of paraffinic hydrocarbons comprises a paraffinic hydrocarbon isolation composition. Embodiments of the paraffinic hydrocarbon isolation composition comprise a mixture of a combination demulsifier and crystal modifier, surfactants, and a solvent. The combination demulsifier and crystal modifier is isopropylamine dodecylbenzene sulfonate ("IDBS"). The surfactants may be nonionic, anionic, cationic, or zwitterionic. The solvent may be any compatible light hydrocarbon. The paraffinic hydrocarbon isolation composition may be used to isolate paraffin hydrocarbons from water and solids. A "paraffin hydrocarbon" as defined herein, is a hydrocarbon having a carbon number of 18 to 36. Without limitation, the paraffinic hydrocarbon isolation composition may modify the paraffin wax crystals found in crude oil tanks, or other such equipment, such that the paraffin hydrocarbons remain fluid and do not precipitate when cooled, moreover the paraffinic hydrocarbon isolation composition may break the water-in-oil emulsion, separating the water from the paraffinic hydrocarbons and also removing any paraffinic hydrocarbons from the surface of the solids. The resulting product is a three phase separation of the paraffinic hydrocarbons, water, and the settled water-wet solids. In embodiments, the paraffinic hydrocarbon isolation composition may be used to isolate the paraffin hydrocarbons from any industrial equipment used in industrial facilities including vessels, tanks, vacuum towers, heat exchangers, piping, distillation columns, and the like. In embodiments, the paraffinic hydrocarbon isolation composition may be used to remove the paraffin hydrocarbons from any equipment used to produce, store, or transport the paraffin hydrocarbons during the processes of crude oil refinement, natural gas processing, hydrocarbon transport, hydrocarbon processing, hydrocarbon cleanup, and the like.

Embodiments of the paraffinic hydrocarbon isolation composition comprise the combination wax crystal modifier and demulsifier, IDBS. The paraffinic hydrocarbon isolation composition may have any wt. % of IDBS suitable for isolating the paraffin hydrocarbons from any water or solids present, such that as pure as possible a volume of the paraffin hydrocarbons is produced. For instance, the paraffin hydrocarbons may be removed from the surface of industrial equipment and subsequently purified by the production of a three phase separation comprising the paraffin hydrocarbons, water, and any settled water-wet solids. In an embodiment, the paraffinic hydrocarbon isolation composition has between about 0.5 wt. % IDBS and about 65.0 wt. % IDBS, alternatively between about 25.0 wt. % IDBS and about 65.0 wt. % IDBS. In some embodiments, the IDBS may comprise about 63.0 wt. % to about 65.0 wt. % of the paraffinic hydrocarbon isolation composition. With the benefit of this disclosure, one having ordinary skill in the art will be able to select an appropriate amount of IDBS to include in the paraffinic hydrocarbon isolation composition for a chosen application.

Embodiments of the paraffinic hydrocarbon isolation composition comprise one or more surfactants. The surfactants may be cationic, anionic, nonionic, zwitterionic, or any combination thereof. Examples of cationic surfactants may include, but are not limited to, quaternary ammonium salts such as an imidazole derivative, heterocycles (e.g., isostearyl ethylimidazolinium ethosulfate ("ISES"), etc.), alkyl-substituted pyridines, morpholinium salts, alkyl ammonium salts (e.g., cetyl trimethylammonium bromide, stearalkonium chloride, dimethyldioctadecylammonim chloride, etc.), the like, or any combination thereof. Examples of anionic surfactants may include, but are not limited to, carboxylates (e.g., trideceth-8 carboxylate, lauryl ether carboxylate, myristyl ether carboxylate), sulfonates (e.g., alkylbenzene sulfonate), sulfates (e.g., alkyl sulfates, alkyl ether sulfates), the like, or any combination thereof. Examples of nonionic surfactants include, but are not limited to, glycol derivatives (e.g., polyethylene glycol, methoxypolyethylene glycols), ethoxylates (e.g., alcohol ethoxylates, ethoxysulfates), the like, or any combination thereof. Examples of zwitterionic surfactants include, but are not limited to, betaines (e.g., cocoamidopropyl betaine), hydroxysultaines (e.g., cocamidopropyl hydroxysultaine), amphoacetates (e.g., sodium lauroamphoacetate), the like, or any combination thereof. The surfactants may be mixed such that the paraffinic hydrocarbon isolation composition comprises multiple classes of surfactants, for example, in an embodiment, the paraffinic hydrocarbon isolation composition may comprise an anionic surfactant, a nonionic surfactant, and a zwitterionic surfactant. In a specific embodiment, the paraffinic hydrocarbon isolation composition comprises the surfactants polyethylene glycol and cocoamidopropyl betaine. The total amount of surfactants may vary as desired in order to achieve the desired result. In embodiments, the total amount of surfactants in the paraffinic hydrocarbon isolation composition may include or be any value between about 0.01 wt. % to about 5 wt. %, alternatively, about 0.05 wt. % to about 3 wt. %, or further alternatively, about 0.1 wt. % to about 1 wt. %. In an embodiment, the paraffinic hydrocarbon isolation composition comprises polyethylene glycol in an amount of about 1 wt. % or less and cocoamidopropyl betaine in an amount of about 0.1 wt. % or less. When choosing surfactants, it is desirable to choose surfactants that do not interfere with the functionality of the IDBS and/or to use an amount of surfactant that does not interfere with the functionality of the IDBS. With the benefit of this disclosure, one having ordinary skill in the art will be able to select an appropriate type(s) and amount of surfactants to include in the paraffinic hydrocarbon isolation composition for a chosen application.

Embodiments of the paraffinic hydrocarbon isolation composition comprise a solvent. The solvent may be any solvent, or combination of solvents, suitable for dissolving and carrying the surfactant and IDBS. Further, it may be desirable to use a solvent that is compatible with the paraffinic hydrocarbons and any cutter stock used to dilute the "sludge," which is the mixture of the paraffinic hydrocarbons, water, and solids present in a vessel, for example, vessel 10 as illustrated on the FIGURE. Examples of solvents generally include light hydrocarbons, aliphatic hydrocarbons, or aromatic hydrocarbons. Without limitation, the solvent may include, but should not be limited to, diesel, biodiesel, cycle oil, crude oil, light sweet crude oil, the like, or a combination thereof. In embodiments, the paraffinic hydrocarbon isolation composition may include the solvent in an amount between about 30.0 wt. % solvent to about 98.0 wt. % solvent, alternatively, between about 30.0 wt. % solvent and about 50.0 wt. % solvent, or further alternatively, between about 32.0 wt. % solvent and about 35.0 wt. % solvent. With the benefit of this disclosure, one having ordinary skill in the art will be able to select an appropriate type and amount of the solvent to include in the paraffinic hydrocarbon isolation composition for a chosen application.

The paraffinic hydrocarbon isolation composition may be prepared by any suitable method. The components may be mixed in any order as desired. For example, the IDBS may be added to a surfactant and mixed, and then the solvent may be added subsequently and mixed with the IDBS and surfactant to form the paraffinic hydrocarbon isolation composition. Alternatively, the IDBS may be added to the solvent and mixed, and then one or more surfactants may be added to the IDBS and solvent and mixed. The paraffinic hydrocarbon isolation composition may be prepared at any suitable temperature or pressure, including ambient temperature and pressure. Thus, there is no preferred way to produce the paraffinic hydrocarbon isolation composition, and the proper production of the paraffinic hydrocarbon isolation composition, with the benefit of this disclosure, will be within the understanding of one of ordinary skill in the art.

In embodiments, a process for isolating the paraffinic hydrocarbons comprises contacting the sludge with the paraffinic hydrocarbon isolation composition. As used herein, "sludge" describes the mixture of the paraffinic hydrocarbons, water, and solids. The term "sludge" does not imply any particular viscosity, clarity, consistency, etc. Further, the term "sludge," does not exclude the presence of other components present in the sludge besides the paraffinic hydrocarbons, water, and solids. For example, the sludge may comprise hydrocarbons in addition to the paraffinic hydrocarbons. In embodiments, the paraffinic hydrocarbon isolation composition may be introduced into a vessel in which a sludge is disposed. The paraffinic hydrocarbon isolation composition may be introduced into the vessel by any suitable means such that the paraffinic hydrocarbon isolation composition contacts the sludge disposed therein. In embodiments, the paraffinic hydrocarbon isolation composition is poured, pumped, injected, the like, or any combination thereof in the vessel. As an example, in some embodiments, the paraffinic hydrocarbon isolation composition is injected into a vessel via a pressurized injection. For example, the paraffinic hydrocarbon isolation composition may be injected into the vessel with pressure at a flow rate of about 1,000 gpm to about 3,500 gpm, alternatively, at about 2,650 gpm to about 3,350 gpm, or further alternatively, at about 2,800 gpm to about 3,200 gpm. With the benefit of this disclosure, one having ordinary skill in the art will be able to select an appropriate injection method for the paraffinic hydrocarbon isolation composition for a chosen application.

As discussed above, embodiments of the paraffinic hydrocarbon isolation composition may be used to produce a three phase separation of paraffinic hydrocarbons, water, and water-wet solids. The FIGURE illustrates an example of a three phase separation 5. The three phase separation 5 is disposed within a vessel 10, for example, a crude oil tank. In the three phase separation 5, the paraffinic hydrocarbon layer 15 is disposed above the water layer 20. Any settled water-wet solids 25 may be disposed beneath the water layer 20. In embodiments, the three phase separation 5 is produced by contacting a sludge mixture comprising the paraffinic hydrocarbons, water, and solids. Heat may be added to help liquefy the sludge so that the paraffinic hydrocarbon isolation composition may be circulated throughout the sludge. Without limitation by theory, the IDBS as a dual function wax crystal modifier and demulsifier, modifies paraffin wax crystal formation so that when the IDBS has been thoroughly circulated amongst the sludge, the paraffin hydrocarbons may not recrystallize even when cooled to below the wax precipitation temperature.

Once a three phase separation 5 has been produced, the paraffinic oil layer 15 may be removed. In some embodiments, it may be desired to drain the water layer 20 or to add water to the water layer 20 such that the paraffinic oil layer 15 is positioned such that a means for removal, for example, a drain, suction valve, etc. may be positioned adjacent to the paraffinic oil layer 15. When draining the water layer 20 or adding to the water layer 20, it may be desirable to not disturb the interface between the water layer 20 and the paraffinic oil layer 15 as this may result in unwanted mixing between the separated layers.

In embodiments, heat may be applied to the paraffinic hydrocarbon isolation composition and/or the sludge containing the paraffinic hydrocarbons. In embodiments, and without limitation by theory, the heat may be used to liquefy (i.e., reduce the viscosity) of the sludge so that the paraffinic hydrocarbon isolation composition may be more easily circulated amongst it. The heat may be applied by steam, boiler and heat exchanger, heated coils, or the like. In embodiments, using steam, the steam may be at any sufficient temperature. In embodiments, and without limitation, enough heat is applied to raise the temperature to the melting point of paraffinic hydrocarbons in the sludge. In an embodiment, the amount of heat applied is between about 35° C. to about 80° C. In some alternative embodiments, the amount of heat applied is between about 40° C. to about 70° C. In further alternative embodiments, the amount of heat applied is between about 40° C. to about 60° C. The heat may also be applied to the paraffinic hydrocarbon isolation composition prior to the paraffinic hydrocarbon isolation composition contacting sludge or concurrently while the paraffinic hydrocarbon isolation composition is contacting the sludge. In embodiments using steam, the steam may be applied at any sufficient pressure, for example, the steam may be applied at a pressure between about 50 psig to about 250 psig, alternatively, 100 psig to about 200 psig, or further alternatively, about 100 psig to about 150 psig. With the benefit of this disclosure, one having ordinary skill in the art will be able to heat the paraffinic hydrocarbons to a desired temperature for a chosen application.

As discussed above, proper circulation may be important in treating the sludge (i.e., to produce a three phase separation 5) as it may be desirable to mix the paraffinic hydrocarbon isolation composition thoroughly with the sludge so as to modify the wax crystal formation potential of as much of the paraffinic hydrocarbons as can be achieved and also to break any water-in-oil or oil-in-water emulsions which may form so as to produce as clean a three phase separation 5 as possible. The circulated paraffinic hydrocarbon isolation composition may be circulated in the tank using any sufficient method to distribute the paraffinic hydrocarbon isolation composition throughout and amongst the sludge as evenly as possible. Once a proper temperature is achieved, the vessel 10 contents (including the sludge and the paraffinic hydrocarbon isolation composition) may be circulated in an amount between about ten vessel volumes to about thirty vessel volumes. For example, the vessel 10 contents may be circulated in an amount between about ten vessel volumes to about twenty vessel volumes, or alternatively, about ten vessel volumes to about fifteen vessel volumes. Once the desired amount vessel volumes have been recirculated; recirculation, heat, and any agitation may be halted so as to allow the phases to separate into the three phase separation 5. With the benefit of this disclosure, one having ordinary skill in the art will be able to circulate the volume of vessel 10 a sufficient amount for a chosen application.

In embodiments, the paraffinic hydrocarbon isolation process may include the use of a cutter. The cutter may be used to reduce the viscosity of the sludge through dilution. The cutter may be any light sweet oil with an API gravity of 30 or greater. Without limitation, for example, the cutter may be light cycle oil, diesel, light sweet crude oil, the like, or any combination thereof. In some embodiments, the cutter may be the same as the solvent used in the paraffinic hydrocarbon isolation composition. The cutter may be added to the sludge in any ratio. For example, the cutter may be added to the sludge in a sludge:cutter:water ratio of about 4:2:1, where the water represents the total water in the tank including water emulsified with the sludge and any added water which may not be emulsified with sludge. Alternatively, the cutter may be added in a sludge:cutter:water ratio of about 4:4:1 or alternatively a sludge:cutter:water ratio of about 2:2:1. With the benefit of this disclosure, one having ordinary skill in the art will be able to add an appropriate amount of cutter to reduce the viscosity of the sludge a sufficient amount.

The production of the three phase separation 5 may take any suitable period of time to complete. In embodiments, the three phase separation 5 may take as long a period of time as it takes to recirculate the desired amount of volumes of the vessel, for example, vessel 10. For example, if a three phase separation 5 uses a ten vessel volume recirculation for the desired separation, the time period to produce the three phase separation 5 is the time suitable to complete the ten volume vessel recirculation. As a result, the period of time sufficient to produce the three phase separation 5 may be dependent upon the size and shape of the vessel, the volume of sludge within the vessel, the recirculation equipment used to recirculate the vessel volume, etc. Further, in addition to the time to recirculate the vessel volume, additional time may be suitable to allow any of the solids, which may be present within the sludge, to settle. In particular, enough time may be provided for the solids to settle out of the paraffinic hydrocarbon layer 15. With the benefit of this disclosure, one having ordinary skill in the art will be able to recognize the appropriate amount of time to apportion for a chosen application.

In embodiments, the purity of a three phase separation 5 may be measured by lab testing. For example, a "Basic Sediment and Water Test" ("BS&W") as described by ASTM D1796-11el may be used to measure the purity of the paraffinic hydrocarbon layer 15. For example, a volume of organic solvent, for example toluene, may be placed in a centrifuge tube. A volume of the paraffinic hydrocarbon layer 15 equal in volume to the volume of the organic solvent may subsequently be added to the centrifuge tube. After mixing the contents, the centrifuge tube may then be placed in a centrifuge and counterbalanced. The centrifuge tube may then be centrifuged for a sufficient amount of time to allow for layer separation. For example, the centrifuge tube may be centrifuged for about 15 minutes at a centrifugal speed of 1,250 rpm or greater. After centrifugation, the centrifuge tube may be removed and the volume of each individual layer (e.g., the paraffinic hydrocarbon layer 15, the water layer 20, and the layer of settled water-wet solids 25) may be determined. The BS&W percentage in the removed sample obtained from the paraffinic hydrocarbon layer may then be determined according to the following equation:

$$BS\&W\ (\%) = [(mL\ water + mL\ settled\ solids)/mL\ paraffinic\ hydrocarbons] \times 100 \qquad (eq.\ 1)$$

In embodiments, the paraffinic hydrocarbon layer 15 may be 95% pure or greater, which refers to the paraffinic hydrocarbon layer 15 having a BS&W percentage of 5% or less. In alternative embodiments, the paraffinic hydrocarbon layer 15 may be 98% pure or greater (i.e. BS&W percentage of 2% or less). In further alternative embodiments, the paraffinic hydrocarbon layer 15 may be 99% pure of greater (i.e. BS&W percentage of 1% or less).

In optional embodiments, once the paraffinic hydrocarbons have been removed, the water in the water layer 20 may be removed and disposed of, for example, at a water treatment facility. The settled water-wet solids 25 may also be removed of and disposed at any facility sufficient for the removal of this class of solids. With the benefit of this disclosure, one having ordinary skill in the art will be able to remove the remaining water and solids from a vessel, for example, vessel 10 in the FIGURE and dispose of the remaining water and solids as appropriate.

In optional embodiments, the paraffinic hydrocarbon isolation composition may be used in conjunction with other products used to treat industrial equipment. In embodiments, the paraffinic hydrocarbon isolation composition may be used concurrently with materials which may remove hazardous reactive sulfides, for example. $H_2S$. For example, the paraffinic hydrocarbon isolation composition may be used in conjunction with mild oxidizers such as methylmorpholine-N-oxide, which may remove hazardous reactive sulfides, for example, $H_2S$ and may convert pyrophoric iron sulfides to non-pyrophoric forms. This is but one embodiment and the paraffinic hydrocarbon isolation composition may be used with any such additional treatment compositions, however, care should be taken to use the paraffinic hydrocarbon isolation composition only with compatible additional treatment compositions that may not negatively interfere with the functionality of the paraffinic hydrocarbon isolation composition.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method for isolating a paraffinic hydrocarbon layer from a sludge comprising a mixture of paraffinic hydrocarbons, water, and solids; the method comprising:
   (A) providing a paraffinic hydrocarbon isolation composition comprising isopropylamine dodecylbenzene sulfonate, a surfactant, and a solvent, wherein the surfactant comprises two surfactants, wherein one of the surfactants is a zwitterionic surfactant, wherein the zwitterionic surfactant is cocoamidopropyl betaine, wherein the other surfactant is a nonionic surfactant, wherein the nonionic surfactant is polyethylene glycol;
   (B) contacting the sludge with the paraffinic hydrocarbon isolation composition; and
   (C) allowing the paraffinic hydrocarbon isolation composition to separate the sludge into a three phase separation comprising a paraffinic hydrocarbon layer, a water layer, and a layer of settled solids.

2. The method of claim 1, further comprising removing the paraffinic hydrocarbon layer from contact with the water layer and the layer of settled solids.

3. The method of claim 1, wherein the isopropylamine dodecylbenzene sulfonate is present in the paraffinic hydrocarbon isolation composition in an amount between about 63 wt. % to about 65 wt. %.

4. The method of claim 1, wherein the surfactant is present in the paraffinic hydrocarbon isolation composition in an amount between about 0.01 wt. % to about 1 wt. %.

5. The method of claim 1, wherein the solvent comprises an aliphatic hydrocarbon, an aromatic hydrocarbon, or any combination thereof.

6. The method of claim 1, wherein the solvent is present in the paraffinic hydrocarbon isolation composition in an amount between about 30 wt. % to about 35 wt. %.

7. The method of claim 1, further comprising heating the sludge prior to or concurrently with the contacting the sludge with the paraffinic hydrocarbon isolation composition.

8. The method of claim 1, wherein the sludge is disposed in a vessel, wherein the volume of sludge is recirculated in the vessel in an amount of about ten times after the contacting the sludge with the paraffinic hydrocarbon isolation composition.

9. The method of claim 1, wherein the basic sediment and water percentage of the paraffinic hydrocarbon layer is less than 5%, as measured by Basic Sediment and Water Test ASTM D1796-11 el.

10. A paraffinic hydrocarbon isolation composition comprising:
   isopropylamine dodecylbenzene sulfonate;
   a surfactant, wherein the surfactant comprises two or more surfactants, wherein one surfactant is a zwitterionic surfactant, wherein the zwitterionic surfactant is cocoamidopropyl betaine, wherein the other surfactant is a nonionic surfactant, wherein the nonionic surfactant is polyethylene glycol; and
   a solvent.

11. The composition of claim 10, wherein the isopropylamine dodecylbenzene sulfonate is present in the paraffinic hydrocarbon isolation composition in an amount between about 63 wt. % to about 65 wt. %.

12. The composition of claim 10, wherein the surfactant is present in the paraffinic hydrocarbon isolation composition in an amount between about 0.01 wt. % to about 1 wt. %.

13. The composition of claim 10, wherein the solvent comprises an aliphatic hydrocarbon, an aromatic hydrocarbon, or any combination thereof.

14. The composition of claim 10, wherein the solvent is present in the paraffinic hydrocarbon isolation composition in an amount between about 30 wt. % to about 35 wt. %.

* * * * *